United States Patent [19]
Porret et al.

[11] 3,920,683
[45] Nov. 18, 1975

[54] DIGLYCIDYLOXYALKYL COMPOUNDS
[75] Inventors: Daniel Porret, Binningen; Friedrich Stockinger, Therwil, both of Switzerland
[73] Assignee: Ciba-Geigy Corporation, Ardsley, N.Y.
[22] Filed: Jan. 7, 1974
[21] Appl. No.: 431,241

[30] Foreign Application Priority Data
Jan. 8, 1973 Switzerland............................ 174/73

[52] U.S. Cl. ....... 260/309.2; 260/309.6; 260/309.7; 260/2 EC; 260/2 EA; 260/2 N; 260/831; 260/834; 260/830 S; 260/830 TW
[51] Int. Cl.²........................................ C07D 235/26
[58] Field of Search............ 260/309.2, 309.6, 309.7

[56] References Cited
UNITED STATES PATENTS
3,843,674   10/1974   Porret.............................. 260/309.2

OTHER PUBLICATIONS
C.A. 71 : 49,940 m (1969) Porret.
C.A. 76 : 86.571 r (1972) Porret et al.

*Primary Examiner*—Sherman D. Winters
*Attorney, Agent, or Firm*—Vincent J. Cavalieri

[57] ABSTRACT

New diglycidyl ether compounds are manufactured by glycidylating the dihydroxy compounds obtained by addition of alkylene oxide to benzimidazolone, tetrahydrobenzimidazolone or hexahydrobenzimidazolone.

The new diglycidyl ethers can be cured with epoxide resin curing agents to give products with good mechanical and dielectric properites.

9 Claims, No Drawings

DIGLYCIDYLOXYALKYL COMPOUNDS

The present invention relates to new, valuable diglycidyl ethers of oxalkylated benzimidazoles for benzimidazolidones which, when mixed with curing agents for epoxide resins, such as amines or carboxylic acid anhydrides, can be used as casting resins, resins for electrical applications, sintering powders, compression moulding compositions, B-stage resins or lacquer resins, and to a process for the manufacture of the new diglycidyl ethers.

The diglycidyl ethers according to the invention correspond to the general formula I

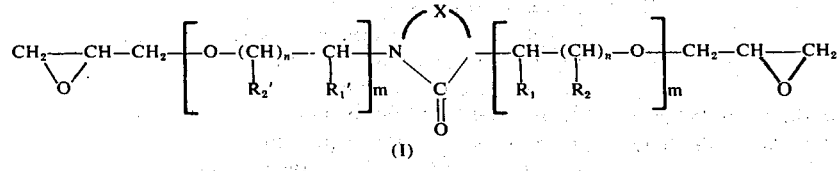

(I)

wherein X denotes a divalent radical of the formulae

 ,  or 

which is unsubstituted or substituted by halogen atoms or lower alkyl groups or optionally by a fused benzene ring, $R_1$ and $R_1'$ independently of one another each denote a hydrogen atom or the methyl group, $R_2$ and $R_2'$ independently of one another each denote a hydrogen atom or the methyl, ethyl or phenyl group of $R_1$ and $R_2$ or $R_1'$ and $R_2'$ together represent the trimethylene or tetramethylene group and $n$ is 0 and $m$ is 1 or $n$ is 1 and $m$ denotes a number from 1 to 30.

Particular interest attaches to diglycidyl ethers of the formula I wherein X denotes an unsubstituted divalent radical of the formulae

 ,  or 

$R_1$ and $R_1'$ each denote a hydrogen atom, $R_2$ and $R_2'$ independently of one another each denote a hydrogen atom or the methyl or phenyl group or $R_1$ and $R_2$ or $R_1'$ and $R_2'$ denote the tetramethylene group, and $n$ is 0 and $m$ is 1 or $n$ is 1 and $m$ denotes a number from 1 to 4, preferably 1.

The diglycidyl ethers of the formula I can be manufactured by adding 2 mols of an epihalogenohydrin, preferably epichlorohydrin, onto 1 mol of a compound of the formula II

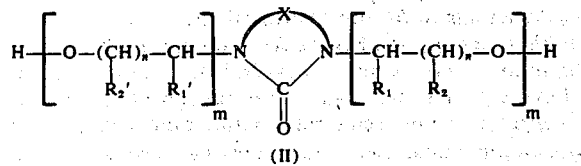

(II)

wherein X, $R_1$, $R_1'$, $R_2$, $R_2'$, $m$ and $n$ have the same meaning as in the formula I, in a known manner in the presence of a catalyst, and subsequently dehydrohalogenating the halogenohydrin compound in the presence of agents which split off hydrogen halide, such as strong alkalis, for example anhydrous sodium hydroxide or aqueous sodium hydroxide solution, to give the diglycidyl ether.

Preferably, this process starts from compounds of the formula II wherein X denotes an unsubstituted radical of the formulae

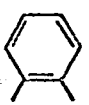 , 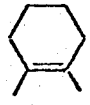 or 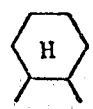

$R_1$ and $R_1'$ each denote a hydrogen atom and $R_2$ and $R_2'$ independently of one another each denote a hydrogen atom or the methyl or phenyl group or $R_1$ and $R_2$ or $R_1'$ and $R_2'$ together denote the tetramethylene group, and $n$ is 0 and $m$ is 1 or $n$ is 1 and $m$ denotes a number from 1 to 4, especially 1.

The addition of the epihalogenohydrin to the compounds of the formula II can be carried out in the presence of either acid or alkaline catalysts. If appropriate, it can also be carried out without catalysts. Suitable catalysts for the addition of epichlorohydrin are above all tertiary amines such as triethylamine, tri-n-propylamine, benzyldimethylamine, N,N'-di-methylaniline and triethanolamine; quaternary ammonium bases, such as benzyltrimethylammonium hydroxide; quaternary ammonium salts such as tetramethylammonium chloride, tetraethylammonium chloride, benzyltrimethylammonium chloride, benzyltrimethylammonium acetate and methyltriethylammonium chloride; hydrazines with a tertiary nitrogen atom, such as 1,1-di-methylhydrazine, which can also be employed in the quaternised form; alkali metal halides, such as lithium chloride, potassium chloride and sodium chloride, bromide or fluoride; and also ion exchange resins with tertiary or quaternary amino groups, as well as ion exchangers with acid amide groups.

As agents which split off hydrogen halide it is possible to use not only sodium hydroxide solution or anhydrous sodium hydroxide but also other strongly alkaline reagents, such as potassium hydroxide, barium hydroxide, calcium hydroxide, sodium carbonate or potassium carbonate.

The addition of the epihalogenohydrin to the compounds of the formula II can be effected with or without solvents, with an excess of epichlorohydrin, at temperatures up to 140°C, under the action of one of the catalysts mentioned, in 30 to 360 minutes. The subsequent dehydrohalogenation can be effected at 40° to 70°C with solid or liquid alkalis and if appropriate whilst azeotropically distilling off the water produced. The alkali halide is removed in a known manner. The diglycidyl ethers produced are isolated by distilling off the excess epihalogenohydrin and, if relevant, the solvent. As a rule, they are obtained as crude crystalline products in yields of up to 100%.

The compounds of the formula II are obtained in a known manner by addition reaction of 1 mol of a compound of the formula III

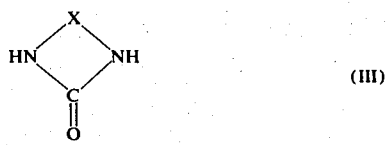

wherein X has the same meaning as in the formula I and 2 mols of formaldehyde or 1 to 60 mols of alkylene oxide of the formulae

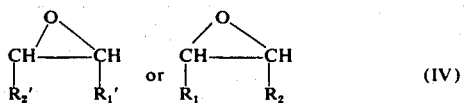

wherein $R_1$, $R_1'$, $R_2$ and $R_2'$ have the same meaning as in the formula I, in the presence of a suitable catalyst.

The compounds of the formula III used for the manufacture of the 1,3-bis-(hydroxyalkyl) compounds of the formula II are benzimidazolone, tetrahydrobenzimidazolone and hexahydrobenzimidazolidone.

Compounds which correspond to the formula IV are ethylene oxide, propylene oxide, butylene oxide, styrene oxide, cyclopentene oxide and cyclohexene oxide.

The addition of the formaldehyde to the two NH groups of the compounds of the formula III can be effected in the presence of acid, alkaline or neutral catalysts and also without catalysts, using a slight molar excess of formaldehyde per equivalent of NH group of the compounds of the formula II. The addition reaction is preferably carried out in a weakly alkaline or weakly acid reaction medium; it commences even at room temperature, and the reaction temperature can be raised up to 100°C.

The addition of an alkylene oxide of the formula IV to compounds of the formula III can be carried out in the presence of alkaline or neutral catalysts. This addition reaction also takes place without catalysts. The reaction temperature in this addition reaction is as a rule between 50° and 180°C. Both addition reactions can also be carried out under pressure, that is to say in an autoclave. Preferably, the addition reaction is carried out in an organic solvent, such as dimethylformamide, toluene, dioxane or halogenated hydrocarbons.

Preferably, however, alkaline catalysts, such as tetraethylammonium chloride or tertiary amines, are used in the manufacture of the 1,3-bis-(hydroxyalkyl) compounds of the formula II in which $m$ is 1. However, alkali metal halides, such as lithium chloride or sodium chloride, can also be used successfully for this addition reaction; reaction also takes place without catalysts.

When manufacturing compounds of the formula II in which $m$ is greater than 1, it is preferred to start from the simple hydroxyalkyl compounds of the formula II in which $m$ is 1 and to add further alkylene oxide to the two OH groups of this compound in the presence of acid catalysts.

Suitable acid catalysts for the addition reaction are particularly Lewis acids such as, for example, $AlCl_3$, $SbCl_5$, $SnCl_4$, $FeCl_3$, $ZnCl_2$, $BF_3$ and their complexes with organic compounds.

Alkaline and neutral catalysts used are the same as in the epihalogenohydrin addition reaction.

The 1,3-bis-hydroxyalkyl-substituted hexahydrobenzimidazolidones of the formula II can also be obtained from the correspondingly substituted benzimidazolone or tetrahydrobenzimidazolone derivatives by catalytic hydrogenation, and this hydrogenation can be carried out in a known manner, either without applied pressure or under pressure.

The diglycidyl compounds of the formula I, according to the invention, react with the customary curing agents for epoxide compounds. They can therefore be crosslinked or cured by addition of such curing agents, analogously to other polyfunctional epoxide compounds. As such curing agents, basic or acid compounds can be employed.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, 2,2-bis(4'-aminocyclohexyl)-propane, 3,5,5-trimethyl-3-(aminomethyl)-cyclohexylamine ("isophoronediamine"), Mannich bases, such as 2,4,6-tris(dimethylaminomethyl)-phenol; M-phenylenediamine, p-phenylenediamine, bis (4-aminophenyl)methane, bis(4-aminophenyl)sulphone and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethane-polyglycidylethers; ketimines, for example from acetone or methyl ethy ketone and bis(p-amino-phenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid (VERSAMID); polymeric polysulphides (THIOKOL); dicyandiamide, aniline-formaldehyde resins; polyhydric phenols, for example resorcinol, 2,2-bis(4-hydroxyphenyl)propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenyl-phosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, trimethyladipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction in particular when using polyamides, dicyandiamide, polymeric polysulphides or polycarboxylic acid anhydrides as curing agents; such accelerators are, for example, tertiary amines, their salts or quaternary ammonium compounds, for example 2,4,6-tris(dimethylaminomethyl)phenol, benzyldimethylamine, 2ethyl-4-methyl-imidazole, triamylammonium phenolate; or alkali metal alcoholates, such as, for example, sodium hexanetriolate.

A further subject of the invention are curable mixtures which contain a diglycidyl compound of the formula I according to the invention, optionally together with other polyepoxide compounds and also curing agents for epoxide resins, such as polyamines or polycarboxylic acid anhydrides.

The diglycidyl compounds according to the invention or their mixtures with other polyepoxide compounds and/or curing agents can be mixed, before curing, with customary modifiers, such as extenders, fillers and reinforcing agents, pigments, dyestuffs, plasticisers, flow control agents, agents for conferring thixotropy, flame-retarding substances and mould release agents.

As extenders, reinforcing agents, fillers and pigments which can be employed in the curable mixtures according to the invention there may, for example, be mentioned: coal tar, bitumen, glass fibres, boron fibres, carbon fibres, cellulose, polyethylene powder, polypropylene powder, mica, asbestos, quartz powder, slate powder, aluminum oxide trihydrate, chalk powder, gypsum, antimony trioxide, bentones, silica aerogel (AEROSIL), lithopone, baryte, titanium dioxide, carbon black, graphite, iron oxide or metal powders, such as aluminum powder or iron powder.

Suitable organic solvents for modifying the curable mixtures are, for example, toluene, xylene, n-propanol, butyl acetate, acetone, methyl ethyl ketone, diacetone-alcohol and ethylene glycol monomethyl ether, monoethyl ether and monobutyl ether.

Particularly for use in the lacquer field, the new diglycidyl compounds can furthermore be partially or completely esterified in a known manner with carboxylic acids such as in particular higher unsaturated fatty acids. It is furthermore possible to add other curable synthetic resins, for example phenoplasts or aminoplasts, to such lacquer resin formulations.

The curable resins can be used, in the unfilled or filled state, optionally in the form of solutions or emulsions, as laminating resins, paints, lacquers, dipping resins, impregnating resins, casting resins, compression moulding compositions, sintering powders, spreading and filling compositions, floor covering compositions, potting and insulating compositions for the electrical industry and adhesives, and for the manufacture of such products.

Curable mouldings of this resin combine good mechanical properties with good heat stability and good electrical properties.

1. MANUFACTURE OF THE STARTING MATERIALS

Example A:
1,3-bis-(2'-hydroxyethyl)-benzimidazolone

A solution of 269.4 g of ethene oxide (6.12 mols) in 300 g of dimethylformamide is added dropwise over the course of 110 minutes to a solution of 402 g of benzimidazolone (3.0 mols) and 3 g of lithium chloride in 1,200 g of dimethylformamide at a temperature of 140° to 148°C (bath temperature 145° to 150°C). After a further 40 minutes' reaction time at 140°C to 145°C, the reaction is complete. The reaction mixture is concentrated to dryness on a rotary evaporator at 20 mm Hg and the resulting residue is after-dried at 90°C under 20 mm Hg. 645 g of a yellow powder (96.8% of theory) having a melting point of 145° to 158°C are obtained.

The crude product can be purified by recrystallisation from water in the ratio of 1:2; the pure substance is obtained in 76.9% yield. The produce melts at 161.2° to 163.4°C.

Elementary analysis:
 found: 59.56%,C; 6.42%,H; 12.59%,N.
 calculated: 59.45%,C; 6.35%,H; 12.60%,N.

The proton-magnetic resonance spectrum (H-NMR) is consistent with the following structure:

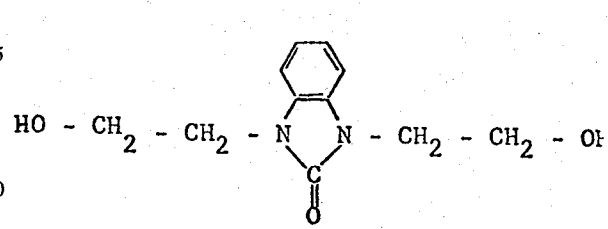

Example B:
1,3-bis-(2'-hydroxy-n-propyl)-benzimidazolone 61.0 g of propene oxide are added dropwise over the course of 135 minutes to a solution of 67.0 g of benzimidazolone (0.5 mol) and 1.0 g of lithium chloride in 150 ml of dimethylformamide at a temperature of 130°-140°C (bath temperature 150°-162°C). After 35 minutes, 10 g of active charcoal are added to the reaction product and after a further 13 minutes the mixture is filtered hot. The clear brown filtrate is concentrated on a rotary evaporator at 90°C under a water pump vacuum and is subsequently dried to constant weight at 90°C and $10^{-1}$ mm Hg.

124.7 g of a grey-brown crystalline crude product (99.6% of theory) are obtained and are purified by recrystallisation from water; the melting point of the product is 149° to 152°C.

Elementary analysis:
 found: 62.20%,C; 7.07%,H; 11.26%,N.
 calculated: 62.38%,C; 7.25%,H; 11.19%,N.

The H-NMR spectrum agrees with the following structure:

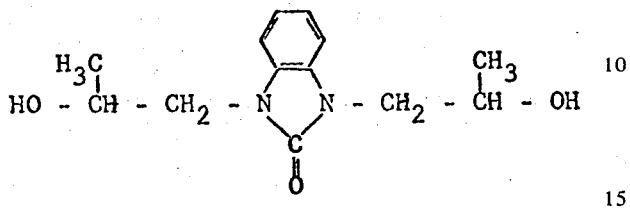

Example C:
1,3-bis-(2'-hydroxy-2'-phenyl-ethyl)-benzimidazolone 335 g of benzimidazolone (2.5 mols) and 601 g of styrene oxide (5.0 mols) are dissolved in 1,000 ml of dimethylformamide and reacted in the presence of 5 g of lithium chloride at 120°C to 163°C (bath temperature 140°C), the reaction mixture reacting exothermically. The reaction is complete after 2 hours and 44 minutes and the reaction product is concentrated on a rotary evaporator at 120°C/20 mm Hg. It is then dried to constant weight at $10^{-1}$ mm Hg. 921.8 g of a pale brown product (98.5% of theory) are obtained. The H-NMR spectrum substantially agrees with the following structure:

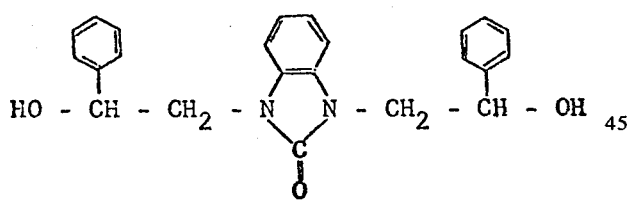

Example D:
1,3-bis-(2'-hydroxyethyl)-tetrahydrobenzimidazolone

A mixture of 69.1 g of tetrahydrobenzimidazolidone (0.5 mol), 46.3 g of ethylene oxide (1.05 mols), 0.5 g of lithium chloride and 250 ml of dimethylformamide is allowed to react in an autoclave for 5 hours at 121°C to 128°C. The clear, brown reaction product is concentrated on a rotary evaporator at 100°C under a water pump vacuum and is subsequently dried to constant weight at 100°C and $10^{-1}$ mm Hg. 123 g of a brown, crystalline crude product (99.9% of theory) are obtained and purified by recrystallisation from isopropanol. Melting point of the pure product: 152.4°–155.4°C.

Elementary analysis:
found: 58.35%,C; 8.10%,H; 12.22%,N.
calculated: 58.39%,C; 8.02%,H; 12.38%,N.

The H-NMR spectrum is consistent with the following structure:

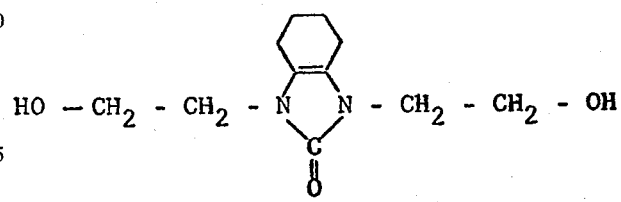

Example E:
1,3-bis-(2'-hydroxy-n-propyl)-tetrahydrobenzimidazolone

A mixture of 276.4 g of tetrahydrobenzimidazolidone (2.0 mols), 244 g of propylene oxide (4.2 mols), 2 g of lithium chloride and 500 ml of dimethylformamide is allowed to react in an autoclave analogously to Example D.

Working up is effected analogously to Example D and 492 g of a brown, clear, highly viscous product (96.7% of theory) are obtained.

The H-NMR spectrum agrees substantially with the following structure:

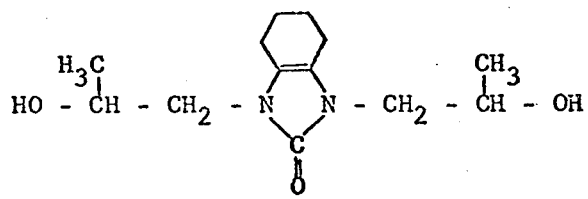

Example F:
1,3-bis-(2'-hydroxy-2'-phenyl-ethyl)-tetrahydrobenzimidazolone

A mixture of 27.6 g of tetrahydrobenzimidazolone (0.2 mol), 48.1 g of styrene oxide (0.4 mol), 0.3 g of lithium chloride and 80 ml of dimethylformamide is allowed to react for 4½ hours at 135°C to 156°C internal temperature (external temperature 166°C). The turbid solution is filtered and the clear filtrate is concentrated on a rotary evaporator at 130°C under a water pump vacuum. Thereafter it is dried to constant weight at 130°C and $10^{-1}$ mm Hg. 71.4 g of a brown, solid product (94.3% of theory) are obtained, of which the H-NMR spectrum substantially agrees with the following structure:

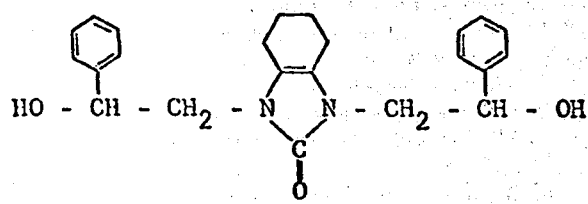

Example G:
1,3-bis-(2'-hydroxyethyl)-hexahydrobenzimidazolone 45.2 g of 1,3-bis-(2'-hydroxyethyl)-tetrahydrobenzimidazolidone (0.2 mol), prepared according to Example D, are dissolved in 200 ml of absolute ethyl alcohol and hydrogenated in the presence of 5 g of Raney nickel for 12 hours at 120°C and 140 atmospheres pressure (ats gauge). The reaction mixture is filtered and the filtrate is concentrated on a rotary evaporator at 90°C under a water pump vacuum. It is dried to constant weight at 90°C and $10^{-1}$ mm Hg and 43.9 g of a grey-greenish viscous turbid product (96.3% of theory) are obtained, which can be purified by vacuum distillation (boiling point 0.6 = 213°–216°C). Yield of pure product: 89.6% of theory.

Elementary analysis:
  found: 57.95%,C; 9.07%,H; 12.03%,N.
  calculated: 57.87%,C; 8.83%,H; 12.27%,N.

The H-NMR spectrum agrees with the following structural formula:

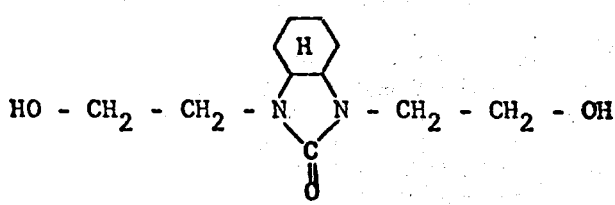

Example H:
1,3-bis-(hydroxymethyl)-tetrahydrobenzimidazolone

A mixture of 552.1 g of tetrahydrobenzimidazolone (4.0 mols) and 681.8 g of 37% strength aqueous formaldehyde (8.4 mols) is adjusted to pH 8 with 1 N sodium hydroxide solution and reacted at 59°–72°C. After 10 minutes, almost all the material has dissolved and 100 ml of water are added. The reaction is complete after 4 hours, the reaction product is cooled, and the substance which has crystallised out is subsequently isolated by filtration. It is dried at 60°C/20 mm Hg and 667 g of a crystalline, brownish compound (84.1% o theory) of melting point 153°–155°C are obtained. Further quantities of the desired product can be isolated from the mother liquor.

Elementary analysis:
  found: 54.57%,C; 7.15%,H; 14.28%,N.
  calculated: 54.53%,C; 7.12%,H; 14.13%,N.

The new diol accordingly corresponds to the following formula:

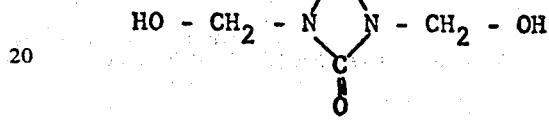

Example I: 1,3-bis-(hydroxymethyl)-benzimidazolone 40 g of benzimidazolone (0.3 mol), 0.5 g of borax and 63 g of 30% strength aqueous formaldehyde (0.6 mol) are adjusted to pH 8 with 1 N NaOH and warmed slowly. After 7 minutes, 16 minutes, 44 minutes and 54 minutes, 10 ml of water are added in each case and the internal temperature is raised to 90°C over the course of 44 minutes. The reaction is allowed to continue fo a further 15 minutes at this temperature, whereby a dark brown clear solution is produced. The mixture i then cooled and the product which has crystallised ou is filtered off and washed with water. The crystalline product is dried at 80°C/20 mm Hg and 56.4 g o brownish crystals (96.7% of theory) of melting poin 157.4°–161°C are obtained.

Elementary analysis:
  found: 55.6%,C; 5.0%,H; 14.4%,N.
  calculated: 55.66%,C; 5.19%,H; 14.43%,N.

The H-NMR spectrum agress with the following structure:

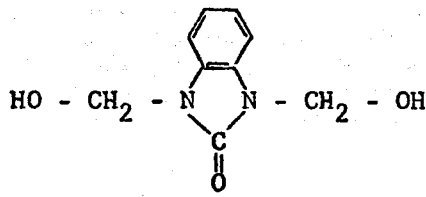

Example J:
1,3-bis-(2'-hydroxy-n-propyl)-5-methyl-benzimidazolone 59.3 g of propylene oxide (1.02 mols) are added dropwise at a temperature of 132°C to 142°C to a solution of 74.5 g of 5-methyl-benzimidazolone (0.5 mol and 1 g of lithium chloride in 150 ml of dimethylform amide. The reaction is complete after a further hou: and the reaction mixture is concentrated on a rotary evaporator at 90°C under a water pump vacuum. The product is then dried to constant weight at 90°C and $10^{-1}$ mm Hg. 126.8 g of a brownish, crystalline powder (96% of theory) are obtained. A double recrystallisa tion from water gives colourless crystals of melting point 124.4°–126°C, with the following analytical data:
Elementary analysis:
found: 63.57%,C; 7.72%,H; 10.66%,N.
calculated: 63.61%,C; 7.63%,H; 10.60%,N.
The H-NMR spectrum agrees with the following structure:

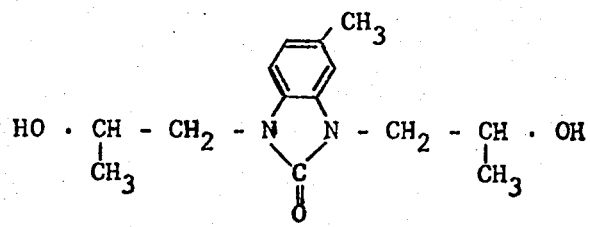

2. MANUFACTURE OF THE DIGLYCIDYL ETHERS

Example 1:
1,3-bis-(2'-glycidyloxyethyl)-benzimidazolone

A mixture of 666.6 g of the 1,3-bis-(2'-hydroxyethyl)-benzimidazolone (3.0 mols) prepared according to Example A, 5,550 g of epichlorohydrin (60 mols) and 8.0 g of tetramethylammonium chloride is stirred for 30 minutes at 90°C.

The mixture is cooled to 60°C and 576 g of 50% strength aqueous sodium hydroxide solution (7.2 mols) are added dropwise over the course of 3 hours with good stirring and under a slight water pump vacuum. The water present in the reaction mixture is then removed continuously by azeotropic circulatory distillation. After the dropwise addition, the mixture is distilled for a further 35 minutes and then cooled to room temperature, the sodium chloride which has precipitated is filtered off and the epichlorohydrin solution is extracted by shaking with 200 ml of water. After separating off the water phase, the epichlorhydrin solution is concentrated in a water pump vacuum at 80°C. The product is then dried to constant weight at 100°C and $10^{-1}$ mm Hg.

1,002 g (99.9% of theory) of a brownish viscous resin with an epoxide content of 5.78 epoxide equivalents/kg (96.7% of theory) are obtained. The total chlorine content of the crude product is 0.6%. The resulting epoxide resin corresponds, according to analytical data, to the following formula:

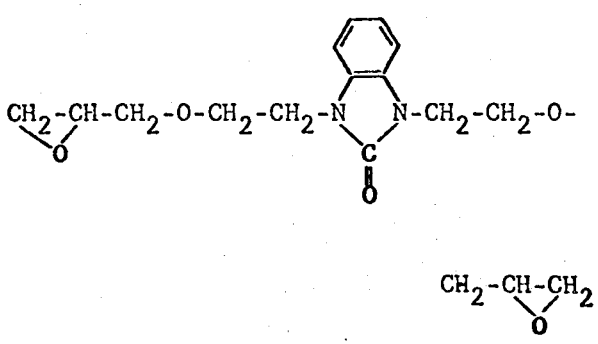

Example 2:
1,3-bis-(2'-glycidyloxypropyl)-benzimidazolone 125.2 g of the 1,3-bis-(2'-hydroxypropyl)-benzimidazolone (0.5 mol) prepared according to Example B, 925 g of epichlorohydrin (10 mols) and 1.5 g of tetramethylammonium chloride are stirred for 1.5 hours at 90°C. The mixture is then cooled to 60°C and, analogously to Example 1, 100 g of 50% strength aqueous sodium hydroxide solution (1.25 mols) are added dropwise over the course of 3 hours and the water of reaction is continuously removed by azeotropic circulatory distillation. To complete the reaction, distillation is allowed to proceed for a further 30 minutes, the mixture is then cooled to room temperature, the sodium chloride produced is filtered off and the epichlorohydrin solution is washed with 100 ml of water. The water phase is separated off, the epichlorohydrin solution is concentrated in a water pump vacuum at 80°C, and the product is then dried to constant weight at 80°C and $10^{-1}$ mm Hg. 177.7 g (98.1% of theory) of a reddish-brown, clear, viscous resin are obtained, of which the epoxide content is 4.90 epoxide equivalents/kg (88.8% of theory).

According to analytical data, the epoxide resin obtained corresponds to the following formula:

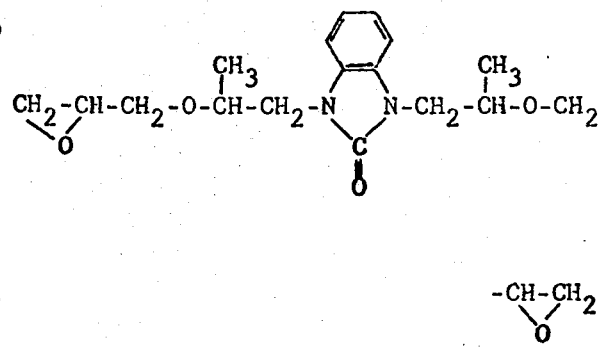

Example 3:
1,3-bis-(2'-glycidyloxy-2'-phenyl-ethyl)-benzimidazolone

A solution of 299.6 g of the 1,3-bis-(2'-hydroxy-2'-phenyl-ethyl)-benzimidazolone (0.8 mol) prepared according to Example C, 1,480 g of epichlorohydrin (16.0 mols) and 4 g of tetramethylammonium chloride is stirred for 30 minutes at 90°C. Analogously to Example 1, 153.6 g of 50% strength aqueous sodium hydroxide solution are added dropwise at 60°C over the course of 2 hours and 40 minutes and the distillation is subsequently allowed to continue for a further 45 minutes. The mixture is worked up according to Example 1, and 388.7 g (99.9% of theory) of a brownish, highly viscous resin having an epoxide content of 3.52 epoxide equivalents/kg (85.6% of theory) are obtained. The chlorine content is 0.9%.

According to analytical data, the epoxide resin obtained corresponds to the following formula:

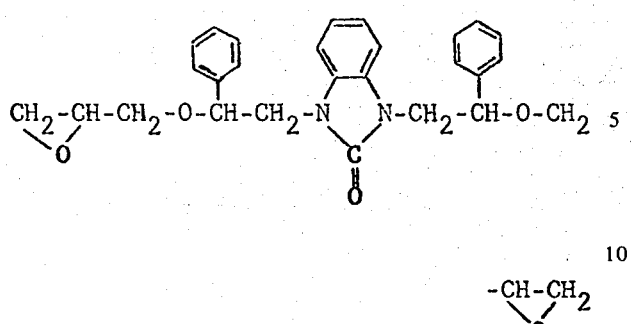

Example 4:
1,3-bis-(2'-glycidyloxy-ethyl)-tetrahydrobenzimidazolone

A mixture of 226.2 g of the 1,3-bis-(2'-hydroxyethyl)-tetrahydrobenzimidazolone (1.0 mol) prepared according to Example D, 1,850 g of epichlorohydrin (20 mols) and 1.5 g of tetramethylammonium chloride is stirred for 1 hour and 10 minutes at 90°C. It is then cooled to 60°C and, analogously to Example 1, 176 g of 50% strength aqueous sodium hydroxide solution are added dropwise over the course of 2.5 hours with good stirring and whilst separating off the water. The mixture is worked up according to Example 1 and 317 g of a brownish, clear, viscous resin (93.7% of theory) are obtained, of which the epoxide content is 5.72 epoxide equivalents/kg (96.8% of theory).

According to analytical data, the epoxide resin obtained corresponds to the following formula:

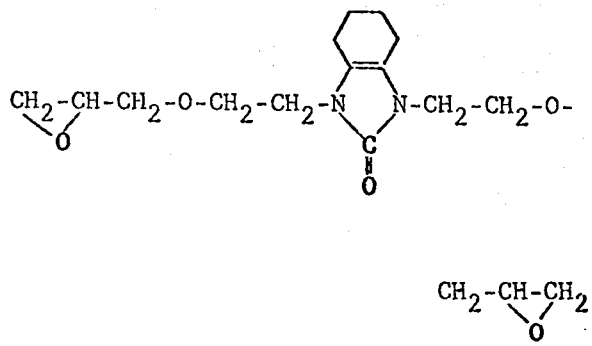

Example 5:
1,3-bis-(2'-glycidyloxy-n-propyl)-tetrahydrobenzimidazolone 476.8 g of the 1,3-bis-(2'-hydroxypropyl)-tetrahydrobenzimidazolone (1.875 mols) prepared according to Example E, 3,470 g of epichlorohydrin (37.5 mols) and 3 g of tetramethylammonium chloride are stirred for 1 hour at 90°C. The mixture is then cooled to 60°C and 360 g of 50% strength aqueous sodium hydroxide solution (4.5 mols) are added over the course of 125 minutes, whilst separating off the water, analogously to Example 1. The mixture is then worked up according to Example 1 and 643 g of a clear, viscous resin (93.6% of theory) of epoxide content 4.89 epoxide equivalents per kg (89.6% of theory) are obtained.

According to analytical data, the epoxide resin corresponds to the following formula:

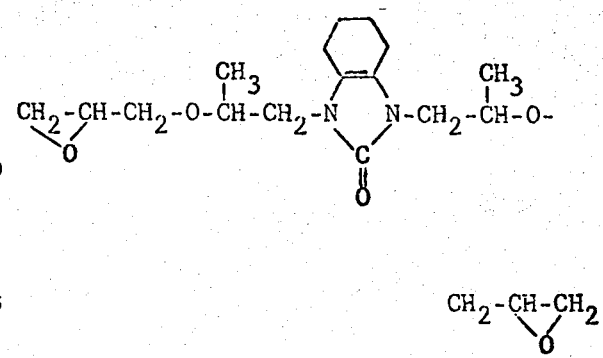

Example 6:
1,3-bis-(2'-glycidyloxy-2'-phenyl-ethyl)-tetrahydrobenzimidazolone A mixture of 37.8 g of the 1,3-bis-(2'-hydroxy-2'-phenyl-ethyl)-tetrahydrobenzimidazolone (0.1 mol) prepared according to Example F, 185 g of epichlorohydrin (2.0 mols) and 0.15 g of tetramethylammonium chloride is stirred for 1 hour at 90°C. Analogously to Example 1, 19.2 g of 50% strength aqueous sodium hydroxide solution (0.24 mol) are added dropwise over the course of 104 minutes at 60°C, and the water of reaction is continuously removed by azeotropic circulatory distillation. The mixture is worked up according to Example 1 and 48.4 g of a red-brown, highly viscous resin (98.3% of theory) having an epoxide content of 3.19 epoxide equivalents per kg are obtained.

According to analytical data, the epoxide resin obtained corresponds to the following formula:

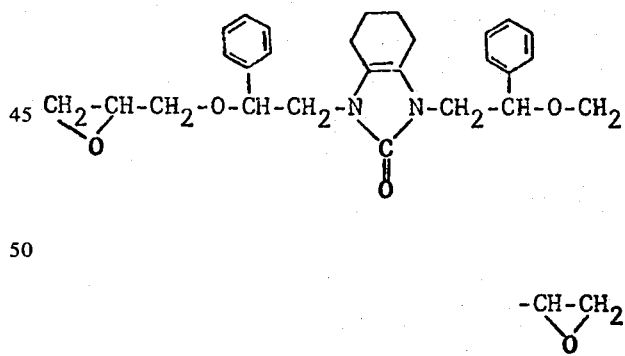

Example 7:
1,3-bis-(2'-glycidyloxyethyl)-hexahydrobenzimidazolone 45.2 g of 1,3-bis-(2'-hydroxyethyl)-hexahydrobenzimidazolone (0.2 mol) prepared according to Example G, 390 g of epichlorohydrin (4.0 mols) and 0.4 g of tetramethylammonium chloride are stirred for 1 hour at 90°C. The mixture is cooled to 60°C and 38.4 g of 50% strength aqueous sodium hydroxide solution (0.48 mol) are added dropwise over the course of 2 hours with continuous elimination of water from the system, and good stirring. Working up takes place according to Example 1. 58.9 g of a brownish, viscous resin (86.5% of theory) are obtained; the epoxide content is 4.95 epoxide equivalents/kg (84.2% of theory).

According to analytical data, the epoxide resin obtained corresponds to the following formula:

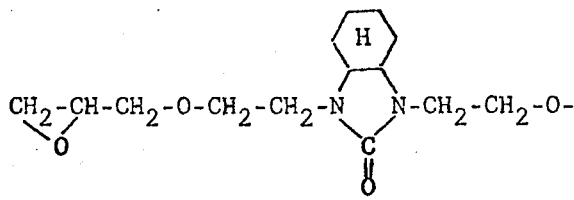

Example 8:
1,3-bis-(glycidyloxymethyl)-benzimidazolone 194.2 g of the 1,3-bis-(hydroxymethyl)-benzimidazolone (1 mol) prepared according to Example I, 1,950 g of epichlorohydrin (20 mols) and 3.0 g of tetramethylammonium chloride are stirred for 40 minutes at 90°C. The mixture is then cooled to 60°C and 176 g of 50% strength aqueous sodium hydroxide solution (2.2 mols) are added with good stirring and whilst removing water, in accordance with the process described in Example 1, and working up also takes place in accordance with Example 1.

260 g of a yellow, clear, viscous resin (84.9% of theory) with 6.46 epoxide equivalents/kg (98.9% of theory) are obtained.

The analytical data of the epoxide resin agree with the following formula:

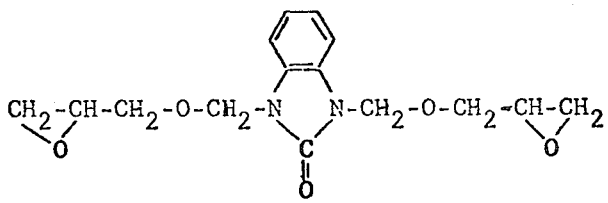

Example 9:
1,3-bis-(2'-glycidyloxy-n-propyl)-5-methyl-benzimidazolone

Analogously to Example 1, 66.1 g of 1,3-bis-(2'-hydroxypropyl)-5-methyl-benzimidazolone (0.25 mol) prepared according to Example J, 463 g of epichlorohydrin (5.0 mols) and 1 g of tetramethylammonium chloride are stirred at 90°C. The mixture is then cooled to 60°C and 50 g of 50% strength aqueous sodium hydroxide solution (0.625 mol) are added dropwise over the course of 2 hours and 50 minutes under azeotropic circulatory distillation and whilst separating off the water. The mixture is worked up according to Example 1 and an ochre-coloured viscous resin with 4.4 epoxide equivalents/kg (82.9% of theory) is obtained in 90.3% yield (85 g).

The analytical data of the epoxide resin agree with the following formula:

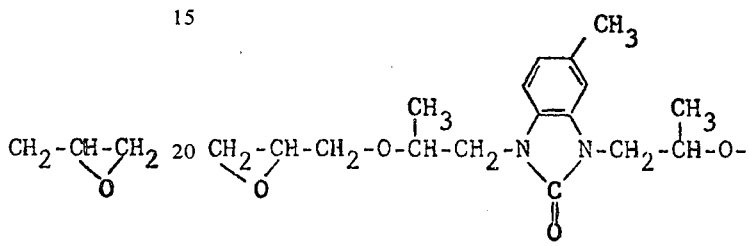
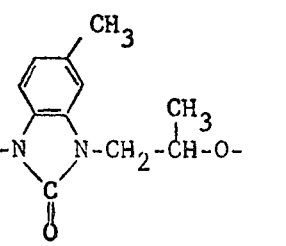

USE EXAMPLES

Example I

A clear homogeneous mixture is prepared at 40°C from 100 parts of the 1,3-bis-(2'-glycidyloxyethyl)-benzimidazolone prepared according to Example 1 and 34.2 parts of 3,3'-dimethyl-4,4'-diamino-dicyclohexylmethane, which is available under the tradename "Laromin C 260". This mixture is poured into an aluminum mould prewarmed to 40°C and cured in 20 hours at 40°C and 6 hours at 100°C. The moulding thus obtained displays the following mechanical properties:

| | |
|---|---|
| Flexural strength (VSM 77,103): | 16.3 – 17.8 kp/mm² |
| Deflection (VSM 77,103): | 11.1 – 15.0 mm |
| Impact strength (VSM 77,105): | 12.8 – 16.5 kp.cm/cm³ |
| Heat distortion point according to Martens (DIN 53,458): | 71°C |
| Water absorption (4 days; 20°C) | 1.41% |

Example II

A homogeneous mixture of 100 parts of 1,3-bis-(2'-glycidyloxy-n-propyl)-benzimidazolone prepared according to Example 2 and 71.6 parts of hexahydrophthalic anhydride is poured into aluminum moulds prewarmed to 90°C and cured in 2 hours at 90°C, 2 hours at 120°C and 16 hours at 150°C. A bubble-free moulding having the following mechanical properties is obtained:

| | |
|---|---|
| Flexural strength (VSM 77,103): | 13.9 – 15.3 kp/mm² |
| Deflection (VSM 77,103): | 9.5 – 9.8 mm |
| Impact strength (VSM 77,105): | 9.0 – 9.8 kp.cm/cm² |

-continued

| | |
|---|---|
| Heat distortion point according to Martens (DIN 53,458) | 71°C |
| Water absorption (4 days; 20°C) | 0.44% |

Example III

A homogeneous mixture of 100 parts of 1,3-bis-(2'-glycidyloxy-2'-phenyl-ethyl)-benzimidazolone obtained according to Example 3 and 46 parts of hexahydrophthalic anhydride is cured in an aluminum mould, analogously to Use example II. Curing conditions: 2 hours at 80°C, 2 hours at 120°C and 18 hours at 150°C. A bubble-free moulding having the following electrical properties is obtained:

| | |
|---|---|
| Tracking resistance (VDE 0303) | = KA 3c |
| Arcing resistance (DIN 53,484) | = L 4 |

Example IV 100 parts of 1,3-bis-(2'-glycidyloxyethyl)-tetrahydro-benzimidazolone obtained according to Example 4 and 83.6 parts of hexahydrophthalic anhydride are stirred at 80°C to give a homogeneous mixture which is poured into an aluminum mould prewarmed to 80°C.

Curing conditions: 6 hours at 80°C, 6 hours at 100°C, 2 hours at 120°C and 16 hours at 150°C.

The moulding obtained has the following properties:

| | |
|---|---|
| Flexural strength (VSM 77,103): | 13.4 – 14.9 kp/mm² |
| Deflection (VSM 77,103): | 6.4 – 9.5 mm |
| Impact strength (VSM 77,105): | 8.5 – 18.8 kp.cm/cm² |
| Heat distortion point according to Martens (DIN 53,458): | 78°C |
| Water absorption (4 days: 20°C) | 0.73% |

We claim:

1. A diglycidyl ether of the formula

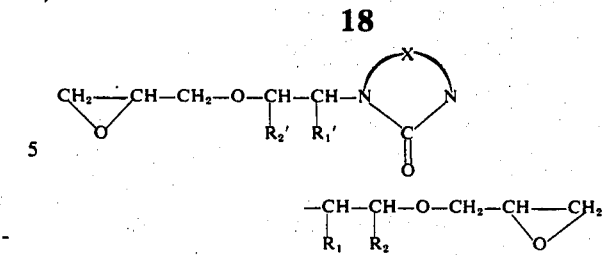

wherein X denotes a divalent radical of the formula

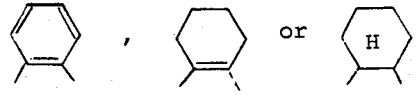

which is unsubstituted or substituted by halogen or lower alkyl, $R_1$ and $R_1'$ each denote hydrogen or methyl, $R_2$ and $R_2'$ each denote hydrogen, methyl, ethyl, or phenyl or $R_1$, and $R_2$, or $R_1'$ and $R_2'$ together represent trimethylene or tetramethylene.

2. A compound as claimed in claim 1, which is 1,3-bis-(2'-glycidyloxyethyl)-benzimidazolone.

3. A compound as claimed in claim 1, which is 1,3-bis-(2'-glycidyloxy-n-propyl)-benzimidazolone.

4. A compound as claimed in claim 1, which is 1,3-bis-(2'-glycidyloxy-2'-phenylethyl)-benzimidazolone 5. A compound as claimed in claim 1, which is 1,3-bis-(2'-glycidyloxy-n-propyl)-5-methyl-benzimidazolone.

6. A compound as claimed in claim 1, which is 1,3-bis-(2'-glycidyloxyethyl)-tetrahydrobenzimidazolone.

7. A compound as claimed in claim 1, which is 1,3-bis-(2'-glycidyloxy-n-propyl)-tetrahydrobenzimidazolone.

8. A compound as claimed in claim 1, which is 1,3-bis-(2'-glycidyloxy-2'-phenylethyl)-tetrahydrobenzimidazolone.

9. A compound as claimed in claim 1, which is 1,3-bis-(2'-glycidyloxyethyl)-hexahydrobenzimidazolone.

* * * * *